(12) United States Patent
Gundy et al.

(10) Patent No.: US 6,702,660 B2
(45) Date of Patent: Mar. 9, 2004

(54) ROUGHENING DEVICE

(75) Inventors: William P. Gundy, 16 Celina Ave. #13, Nashua, NH (US) 03063; Ernst Geiger, Russell, NY (US)

(73) Assignee: William P. Gundy, Milford, NH (US)

( * ) Notice: Subject to any disclaimer, the term of this patent is extended or adjusted under 35 U.S.C. 154(b) by 32 days.

(21) Appl. No.: 10/098,164

(22) Filed: Mar. 14, 2002

(65) Prior Publication Data

US 2002/0160705 A1 Oct. 31, 2002

Related U.S. Application Data

(63) Continuation-in-part of application No. 09/658,836, filed on Sep. 8, 2000, now Pat. No. 6,398,634.

(51) Int. Cl.$^7$ ................................................ B23F 21/03
(52) U.S. Cl. ........................................ 451/547; 451/541
(58) Field of Search ................................ 451/541, 544, 451/546, 547, 484, 486, 485, 51, 61, 27; 408/203.5, 213; 175/396, 415, 412, 426, 428

(56) References Cited

U.S. PATENT DOCUMENTS

| | | | | |
|---|---|---|---|---|
| 2,797,535 A | * | 7/1957 | Atkinson | 451/464 |
| 5,725,416 A | * | 3/1998 | Russell | 451/54 |
| 6,213,860 B1 | * | 4/2001 | Tunstall et al. | 451/541 |
| 6,398,634 B1 | * | 6/2002 | Gundy et al. | 451/547 |

* cited by examiner

*Primary Examiner*—Dung Van Nguyen
(74) *Attorney, Agent, or Firm*—Bourque & Associates, P.A.

(57) ABSTRACT

One embodiment of a roughening device comprises a hub, a body having a wall defining a cavity, and an elastomeric material within the cavity. A plurality of cutting elements extend through holes in the wall of the body such that a base of each cutting element is positioned against the elastomeric material.

16 Claims, 2 Drawing Sheets

ROUGHENING DEVICE

CROSS-REFERENCE TO RELATED APPLICATIONS

The present application is a continuation-in-part of U.S. patent application Ser. No. 09/658,836 filed Sep. 8, 2000, now U.S. Pat. No. 6,398,634.

TECHNICAL FIELD

The present invention relates generally to cutting or abrading devices, and in particular, to a roughening device used to roughen cored holes.

BACKGROUND INFORMATION

Numerous systems are known for attaching a structural member to a concrete substrate by means of an anchoring device secured by adhesive in a drilled hole. Drilling tools for making the initial hole in the concrete suffer from several disadvantages.

Carbide drill bits produce rough walled holes, which maximize the attachment of the adhesive of the anchoring device within the drilled hole. Unfortunately, carbide drill bits are subject to wear and have short usable lives.

Diamond drills, on the other hand, have enhanced wear properties. Unfortunately, diamond drills produce smooth drill holes. The resulting holding power of an adhesive in a diamond drilled hole is up to 100 percent less than the holding power of the same adhesive in a carbide drilled hole.

Accordingly, a roughening device is need for roughening the internal surface of a pre-drilled hole to enhance attachment of an anchoring device and adhesive placed therein.

SUMMARY

In accordance with one aspect of the present invention, a roughening device comprises a hub adapted to be attached to a shaft of a drilling device. A body extends from the hub and has a wall defining a cavity and having a plurality of holes extend through the wall. An elastomeric material is located in the cavity defined by the wall of the body, and a plurality of cutting elements extend through respective holes. A base of each of the cutting elements is positioned within the cavity and against the elastomeric material. A cutting tip of each of the cutting elements is positioned outside of the wall of the body.

In one embodiment, the hub is located at an upper portion of the body, and the body includes flanges extending from the body at an end opposite the hub to retain the elastomeric material. In another embodiment, the hub is located at a lower portion of the body, the elastomeric material encapsulates the shaft, and a cover covers an end of the body opposite the hub.

According to another aspect of the present invention, a roughening device comprises a body having a wall defining a cavity and a plurality of holes extend through the wall. A plug is located within the cavity of the body and is adapted to be attached to a shaft of a drilling device. Cutting elements extend through respective holes in the wall. A base of each of the cutting elements is positioned within the cavity and against the plug. A cutting tip of each of the cutting elements is positioned outside of the wall of the body. One embodiment of the plug is made of a rigid material such as metal.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
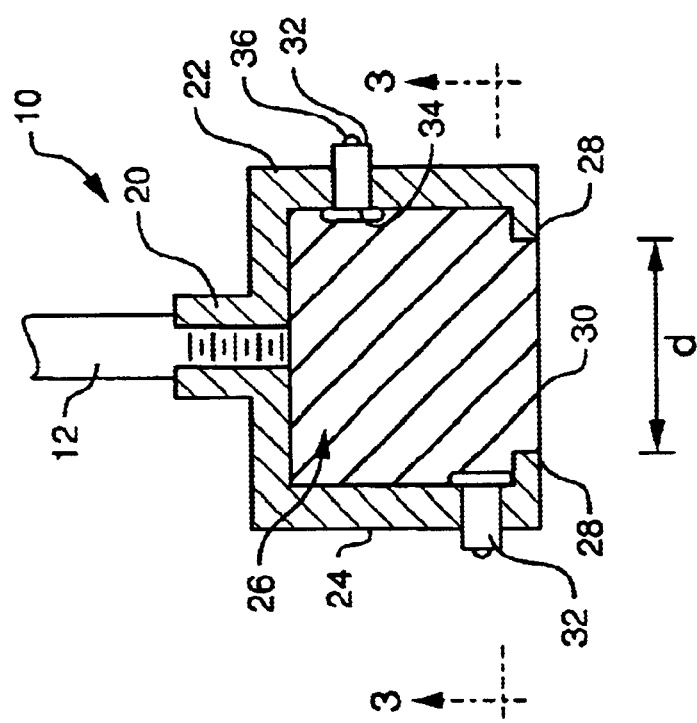
FIG. 1 is a cross-sectional view of a roughening device, according to one embodiment of the present invention.

Referring to FIG. 1, one embodiment of a roughening device 10 is shown attached to a shaft 12 of a drill or other power tool (not shown), which rotates the roughening device 10. The roughening device 10 is preferably removably attached to the shaft 12 to allow the roughening device to be used with different types of power tools.

The roughening device 10 includes a hub 20 attached to the shaft 12. Although the exemplary embodiment of the hub 20 is internally threaded for threadably engaging the shaft 12, other ways of attaching to the shaft 12 are also contemplated. A body 22 extends from the hub 20 and is preferably one piece with the hub 20. The body 22 has a wall 24 defining a cavity 26. Although the wall 24 is shown as cylindrical in the exemplary embodiment, other shapes are contemplated. In one embodiment, the hub 20 and body 22 are turned from a piece of steel. The hub 20 and body 22 can also be made from other types of metal or other suitable rigid materials using other methods.

An elastomeric material 30 is located within the cavity 26 defined by the wall 24 of the body 22. In one embodiment, flanges 28 extend from the body 22 at an end opposite the hub 20. The flanges 28 create a smaller inside diameter d to retain the elastomeric material 30 in the cavity 26. The elastomeric material 30 can be any typical elastomeric material including, but not limited to, polyurethane, and natural or synthetic rubbers.

Figure 3:
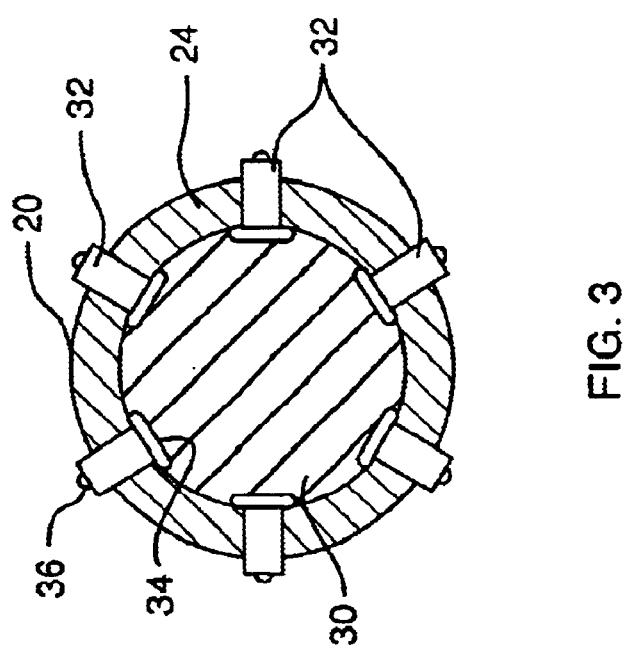
FIG. 3 is a cross-sectional view of the roughening device shown in FIG. 1 taken along line 3—3.

Cutting elements 32 extend through holes in the wall 24 of the body 22. In one embodiment of the roughening device 10, shown in FIG. 3, the cutting elements 32 are substantially equally spaced around the circumference of the body 22. The number and placement of cutting elements 32 (i.e., rows or staggered arrangement) is not a limitation of the present invention, but is within the determination of someone skilled in the art. According to one embodiment, the cutting elements 30 are made of carbide, but other types of material and cutting elements are within the scope of the present invention.

A base 34 of each cutting element 32 is positioned within the cavity 26 and against the elastomeric material 30. A cutting tip 36 of each cutting element 32 extends outside of the wall 24. The body 22 allows the cutting elements 32 to be set at a substantially exact diameter, while the elastomeric material 30 allows the cutting elements 32 to move in and out against the surface to be roughened. This movement compensates for a varying hole diameter and cushions the cutting elements 32, giving a longer life.

Figure 2:
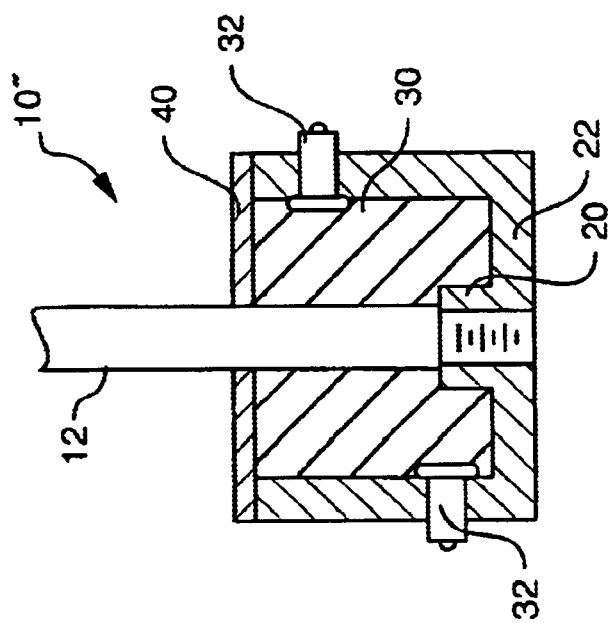
FIG. 2 is a cross-sectional view of a roughening device, according to another embodiment of the present invention.

Referring to FIG. 2, another embodiment of the roughening device 10' includes the hub 20 at the lower portion of the body 22. The elastomeric material 30 encapsulates the shaft 12, which engages the hub 20 to drive the roughening device 10' at the lower portion. An optional cover 40 can be positioned over the elastomeric material 32 to retain the elastomeric material 30.

Figure 4:
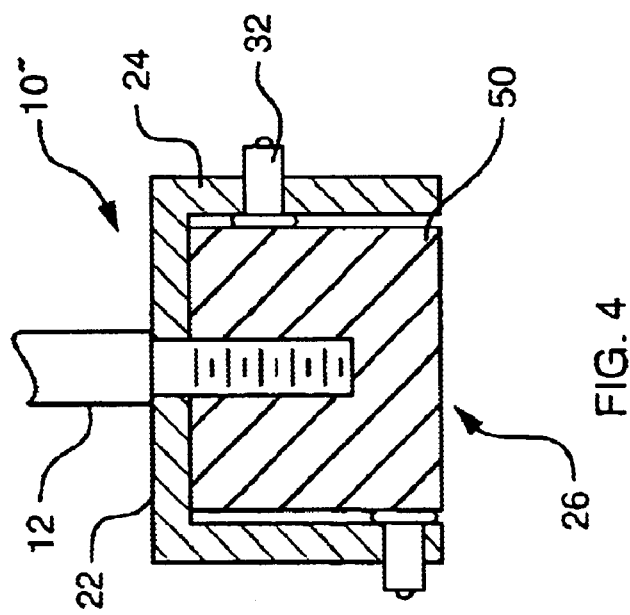
FIG. 4 is a cross-sectional view of a roughening device, according to a further embodiment of the present invention.

Referring to FIG. 4, a further embodiment of the roughening device 10" includes a plug 50 located in the cavity 26 defined by the wall 24 of the body 22. The shaft 12 is attached directly to the plug 50, for example, by threading into the plug 50. In one embodiment, the plug 50 is made of a rigid material such as metal. This allows the cutting elements 32 to be rigidly mounted and easily replaced.

In use, the roughening device 10, 10', 10" is attached to the shaft 12 of the drilling device and passed one or two times in and out of a pre-drilled hole. An adhesive material and an anchoring device can then be inserted into the now roughened drilled hole in a manner well known in the prior art.

Modifications and substitutions by one of ordinary skill in the art are considered to be within the scope of the present invention, which is not to be limited except by the following claims.

The invention claimed is:

1. A roughening device comprising:
    a hub adapted to be attached to a shaft of a drilling device;
    a body extending from said hub, said body having a wall defining a cavity, wherein a plurality of holes extend through said wall;
    an elastomeric material located in said cavity defined by said wall of said body; and
    a plurality of cutting elements extending through respective said plurality of holes, wherein a base of each of said cutting elements is positioned within said cavity and against said elastomeric material, and wherein a cutting tip of each of said cutting elements is positioned outside of said wall of said body.

2. The roughening device of claim 1 wherein said wall has a generally cylindrical outer surface.

3. The roughening device of claim 1 wherein said body includes flanges extending from said body at an end opposite said hub, wherein said flanges retain said elastomeric material.

4. The roughening device of claim 1 wherein said elastomeric material encapsulates said shaft of said drilling device.

5. The roughening device of claim 4 further comprising a cover covering an end of said body opposite said hub.

6. The roughening device of claim 1 wherein said hub is located at a lower portion of said body.

7. The roughening device of claim 1 wherein said hub is located an upper portion of said body.

8. The roughening device of claim 1 wherein said cutting elements are made of carbide.

9. The roughening device of claim 1 wherein said base of each of said cutting elements is embedded in said elastomeric material.

10. The roughening device of claim 1 wherein said hub is threaded for threadably attaching to said shaft of said drilling tool.

11. A roughening device comprising:
    a body having a wall defining a cavity, wherein a plurality of holes extend through said wall;
    a plug located within said cavity of said body, wherein said plug is adapted to be attached to a shaft of a drilling device; and
    a plurality of cutting elements extending through respective said plurality of holes, wherein a base of each of said cutting elements is positioned within said cavity and against said plug, and wherein a cutting tip of each of said cutting elements is positioned outside of said wall of said body.

12. The roughening device of claim 11 wherein said plug is made of a rigid material.

13. The roughening device of claim 11 wherein said plug is made of metal.

14. The roughening device of claim 11 wherein said cutting elements are made of carbide.

15. The roughening device of claim 11 wherein said plug is threaded for threadably attaching to said shaft of said drilling tool.

16. The roughening device of claim 11 wherein said plug is made of an elastomeric material.

\* \* \* \* \*